No. 895,428. PATENTED AUG. 11, 1908.
F. A. CHURCH.
PLEASURE RAILWAY CAR.
APPLICATION FILED JAN. 2, 1908.

2 SHEETS—SHEET 2.

Frederick A. Church
Inventor

Witnesses

UNITED STATES PATENT OFFICE.

FREDERICK A. CHURCH, OF CHICAGO, ILLINOIS.

PLEASURE-RAILWAY CAR.

No. 895,428.

Specification of Letters Patent.

Patented Aug. 11, 1908.

Application filed January 2, 1908. Serial No. 409,004.

*To all whom it may concern:*

Be it known that I, FREDERICK A. CHURCH, a citizen of the United States, residing at Chicago, in the county of Cook and State of Illinois, have invented certain new and useful Improvements in Pleasure-Railway Cars, of which the following is a specification.

This invention is a car particularly adapted and intended for pleasure railways, and has for its object to so construct the car that it will adjust itself to curves in the track.

The ordinary coaster car for pleasure railways is made with a solid body or platform carrying two or more seats and is carried on four caster wheels which follow in the direction in which the car is running, but owing to the fact that the frames of the wheels are rigidly attached to the body, the car cannot run around a sharp curve with a tilted track except on three wheels.

The car forming the subject of the present invention is made with a body or platform in two sections, each section carrying one seat and supported on two caster wheels.
The two sections of the car are held together with a heavy horizontal longitudinal bolt or pivot pin located at the median line of the car, so that the car platform sections can swivel or incline independently of each other. Thus when the car runs around a sharp curve which is tilted, each section of the car adapts itself to the track independently of the other, and each wheel will remain on the track and carry an equal amount of the load.

Figure 1:
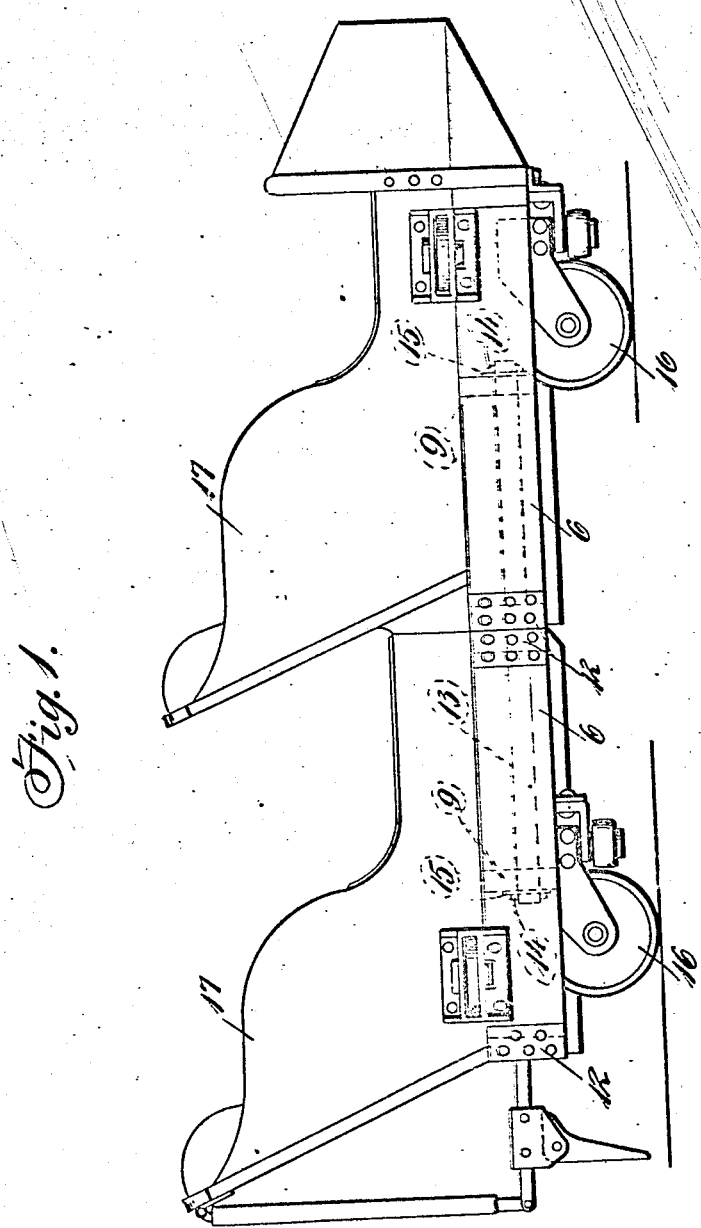
Figure 2:
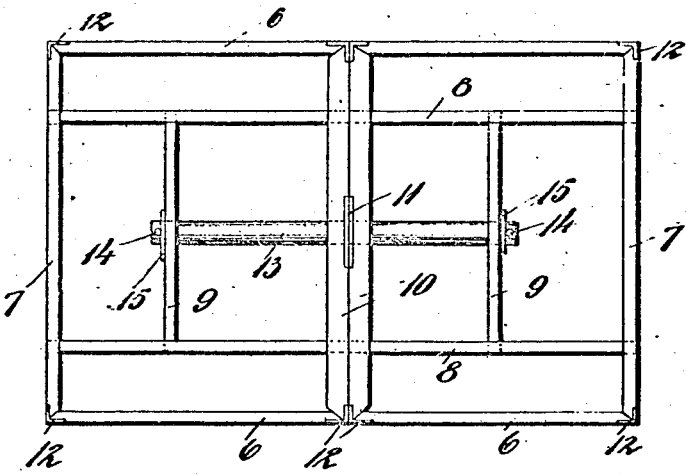
Figure 3:
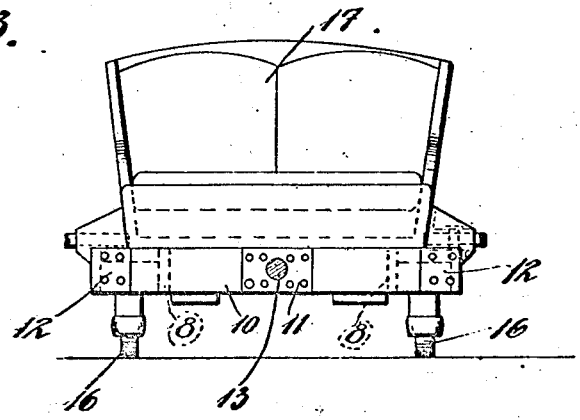

In the accompanying drawings, Figure 1 is a side elevation of the car. Fig. 2 is a plan of the platform or body frame. Fig. 3 is a vertical cross section.

The side and end sills of the frame are indicated at 6 and 7 respectively, and the frame also has intermediate longitudinal sills 8 and cross sills 9, and also middle sills 10, which meet or abut against each other.
The frame or platform is formed in two sections as referred to above, and the sills 10 bear against each other and may be provided with metal wear plates indicated at 11. The frame sections are strengthened by suitable metal corner pieces 12. The pivot bolt or pin for connecting the two sections is indicated at 13, and it is located at the middle line of the car and extends horizontally through the meeting sills 10 and through the intermediate cross sills 9, and is held in place by pins 14 extending through holes in the ends outside of said cross sills, washer plates 15 being interposed to stand the wear. This pivot bolt is large and of sufficient strength to stand the strain, which is considerable.

Each section of the platform is mounted upon independent caster wheels or trucks 16 of known construction, and each section of the platform is provided with a seat 17 which may be of any desired construction. The other appointments or parts of the car may include the usual devices for operating and guiding the same, and inasmuch as they form no part of this invention and are well known in the art, they need not be particularly described.

When the car runs around a curved and tilted track the front and rear sections turn with respect to each other, upon the bolt 13 as a pivot, and inasmuch as each section is carried upon two wheels, said two wheels will fit squarely upon the track and each will sustain its share of the weight. The caster wheels will follow the curvature of the track and the pivotal connections between the sections will accommodate the variation in height incident to tilt or lateral inclination of the track. The device will support strain better than ordinary cars and will also be safer in use.

I claim:

1. A car floor-frame made in front and rear sections in contact with each other and united by a longitudinal pivot bolt, the sections having independent trucks.

2. A car frame made in front and rear sections each of which is mounted on two caster wheels, the sections being united by a longitudinal pivot bolt at the middle line.

3. A car floor-frame made in front and rear sections, the sections having cross sills in contact with each other, and a longitudinal pivot bolt extending through the sills and connecting the sections at the middle line, and independent trucks on which the sections are respectively mounted.

In testimony whereof I affix my signature, in presence of two witnesses.

FREDERICK A. CHURCH.

Witnesses:
NELLIE FELTSKOG,
H. G. BATCHELOR.